United States Patent
Ingleton

(10) Patent No.: US 10,378,601 B2
(45) Date of Patent: Aug. 13, 2019

(54) COUPLING

(71) Applicant: BAE SYSTEMS plc, London (GB)

(72) Inventor: Martyn Ingleton, Rochester (GB)

(73) Assignee: BAE SYSTEMS plc, London (GB)

( * ) Notice: Subject to any disclaimer, the term of this patent is extended or adjusted under 35 U.S.C. 154(b) by 60 days.

(21) Appl. No.: 15/531,282

(22) PCT Filed: Nov. 25, 2015

(86) PCT No.: PCT/GB2015/053589
§ 371 (c)(1),
(2) Date: May 26, 2017

(87) PCT Pub. No.: WO2016/083801
PCT Pub. Date: Jun. 2, 2016

(65) Prior Publication Data
US 2017/0343068 A1 Nov. 30, 2017

(30) Foreign Application Priority Data
Nov. 27, 2014 (GB) .................. 1421034.8

(51) Int. Cl.
*F16D 65/18* (2006.01)
*B64C 13/22* (2006.01)
(Continued)

(52) U.S. Cl.
CPC ............ *F16D 65/18* (2013.01); *B64C 13/22* (2013.01); *F16D 55/226* (2013.01); *F16D 55/228* (2013.01); *B64C 13/02* (2013.01); *F16D 2121/14* (2013.01); *F16D 2121/28* (2013.01); *F16D 2121/30* (2013.01)

(58) Field of Classification Search
None
See application file for complete search history.

(56) References Cited

U.S. PATENT DOCUMENTS 3,091,316 A    5/1963  Huffman
3,285,376 A    11/1966 Starrantino
(Continued)

FOREIGN PATENT DOCUMENTS

DE    19846392 A1    4/2000
EP     2311729 A1    4/2011
(Continued)

OTHER PUBLICATIONS

FAA: Automated Auto-pilot—Sought background on AP systems, common practices and technologies implemented—https://www.faa.gov/regulations_policies/handbooks_manuals/aviation/advanced_avionics_handbook/media/aah_ch04.pdf (Page last modified: Mar. 23, 2017 11:18:26 AM EDT).*

(Continued)

*Primary Examiner* — Jacob S. Scott
*Assistant Examiner* — Murad Jahmani
(74) *Attorney, Agent, or Firm* — Finch & Maloney PLLC

(57) ABSTRACT

A coupling comprising a brake plate (70); a first friction pad (64) operable to be selectively biased against the brake plate (70). In a first mode of operation the first friction pad (64) is biased against the brake plate (70) by a first force. In a second mode of operation the first friction pad (64) is biased against the brake plate (70) by a second force. The second force is substantially greater than the first force.

20 Claims, 3 Drawing Sheets

(51) Int. Cl.
*F16D 55/228* (2006.01)
*F16D 55/226* (2006.01)
F16D 121/14 (2012.01)
F16D 121/28 (2012.01)
B64C 13/02 (2006.01)
F16D 121/30 (2012.01)

(56) References Cited

U.S. PATENT DOCUMENTS 4,603,594 A  8/1986  Grimm
2007/0102256 A1  5/2007  Bacon

FOREIGN PATENT DOCUMENTS

| JP | 2008144786 A | 6/2008 |
| WO | 2009023395 A1 | 2/2009 |
| WO | 2009082304 A1 | 7/2009 |
| WO | 2016083801 A1 | 6/2016 |

OTHER PUBLICATIONS

International Preliminary Report on Patentability received for Patent Application No. PCT/GB2015/053589, dated Jun. 8, 2017. 9 pages.
International Search Report and Written Opinion received for Patent Application No. PCT/GB2015/053589, dated Apr. 5, 2016. 13 pages.
GB Intellectual Property Office Search Report under Section 17(5) received for GB Patent Application No. 1421034.8 dated May 15, 2015. 3 pages.

* cited by examiner

COUPLING

FIELD OF THE INVENTION

The present disclosure relates to a coupling.

In particular the disclosure is concerned with a coupling for a vehicle control system which provides a selectable linkage between a vehicle control lever and an actuator.

BACKGROUND

Existing methods of moving aircraft controls independently from the pilot's input, for example for auto-pilot type applications, use servo actuators coupled to the primary flight control levers via linkages. Control levers may also be coupled to actuators to assist with stability of the control lever during use by a pilot.

An example of an actuator system 10 having a brake-clutch device for flight controls is shown in FIGS. 1, 2. A flight control 12, for example a joystick 14, is linked via a linkage comprising a ring 16, which surrounds an armature 18, which in turn surrounds a motor output shaft 20 which extends from a motor 22.

The ring 16 and armature 18 are coupled via a spline arrangement 23 configured such that the ring 16 and armature 18 may not rotate relative to one another, but they may slide axially relative to one another.

The armature 18 is mounted to the shaft 20 via bearing means 24. The armature 18 provides part of a brake/clutch assembly 30. Another part of the clutch 30 comprises a clutch plate 32 fixedly mounted to the end of the shaft 20. The clutch plate 32 is provided with an electromagnet and spring housing 34. Coupling means 36 in the form of interlocking teeth are provided for engagement between the plates 18, 32 of the clutch 30. A non rotatable brake/clutch stator 40, which provides an anchor, is also provided between the ring 16 and the armature 18.

In the unlikely event of a servo system failure (e.g. a "power off state"), or should the user merely want full control authority, the motor 22 is decoupled from the flight linkage, as shown in FIG. 1. The armature 18 is pushed away from the plate 32 by springs 42 located between the armature 18 and the plate 32. The same action traps the stator 40 between the armature 18 and the ring 16. This provides frictional and/or damping resistance to the movement of the ring 16, and hence the control stick 12, 14. The frictional resistance is advantageous as it allows more precise manoeuvring of the controls by the user.

Once power is restored, and as shown in FIG. 2, the electromagnet 34 is actuated and draws the armature 18 away from engagement with the stator 40, to engage with the teeth of the clutch plate 32. However, the armature 18 remains in engagement with the ring 16 by their interconnecting splines 23 to provide a drive path between the motor 22 and ring 16.

While this system works well, the magnetically operated clutch-brake device is heavy and requires considerable electrical power.

Hence an actuator which can be used for coupling and decoupling flight controls from their associated actuator, but which is inherently lighter and demands less electrical power, is highly desirable.

SUMMARY OF THE INVENTION

According to the present disclosure there is provided an apparatus and method as set forth in the appended claims.

Other features of the invention will be apparent from the dependent claims, and the description which follows.

Accordingly there may be provided a coupling comprising: a brake plate; a first friction pad operable to be selectively biased against the brake plate such that: in a first mode of operation the first friction pad is biased against the brake plate by a first force; and in a second mode of operation the first friction pad is biased against the brake plate by a second force; the second force being substantially greater than the first force.

The first friction pad may be operable to be selectively biased against the brake plate such that: in a third mode of operation the first friction pad is biased against the brake plate by a third force, wherein the third force is greater than the first force but lower than the second force.

The first friction pad may be biased against the brake plate by an actuator.

There may be provided a second friction pad biased into contact with the brake plate.

The second friction pad may be biased against the brake plate by a resilient member.

The coupling may further comprise a housing which carries the actuator, the actuator being located in a first cavity provided in the housing.

The housing may carry the resilient member, the resilient member being located in a second cavity provided in the housing.

The resilient member may be biased against the brake plate on the opposite side of the brake plate to the actuator such that the resilient member is operable to bias the second friction pad in an opposite direction to which the actuator is operable to bias the first friction pad.

The brake plate may be is fixedly mounted to a rotatable drive shaft which is rotatable about a rotational axis.

The housing may be rotatable about the same rotational axis as the brake plate.

There may also be provided a vehicle control system comprising a vehicle control lever coupled to a lever drive via a coupling according the present disclosure.

There may also be provided a vehicle control system wherein the vehicle control lever is coupled to a lever drive via the housing of a coupling according to the present disclosure.

There may also be provided a method of operating a vehicle control system, the system comprising a lever coupled a lever drive via a brake plate; a first friction pad operable to be selectively biased against the brake plate; the method comprising the steps of: biasing the first friction pad against the brake plate by a first force when the lever drive is in a first mode of operation; and biasing the first friction pad against the brake plate by a second force when the lever drive is in a second mode of operation, the second force being substantially greater than the first force.

The method may further comprise: selectively biasing the first friction pad against the brake plate by a third force; wherein the third force is greater than the first force but lower than the second force.

The first mode of operation may be when the lever drive is non operational. The second mode of operation may be when the lever drive is operational.

The arrangement of the present invention thus provides a light weight and energy efficient solution to the requirement of coupling and decoupling of vehicle control levers from their respective actuators, and when in the actuator decoupled state will provide the required frictional resistance to movement.

BRIEF DESCRIPTION OF THE DRAWINGS

Examples of the present disclosure will now be described with reference to the accompanying drawings, in which.

DETAILED DESCRIPTION

Figure 1:
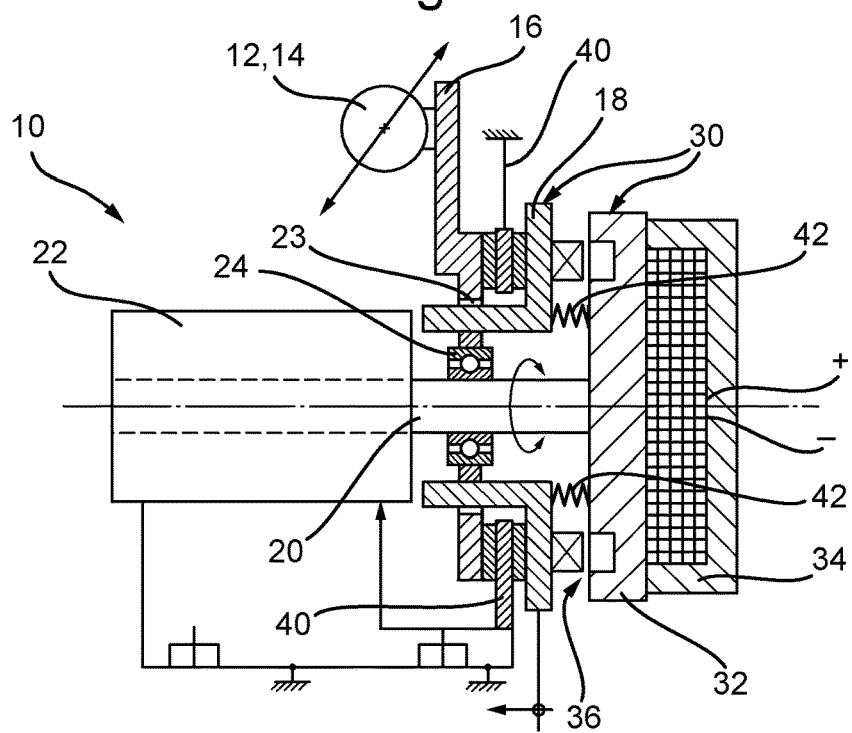
FIG. 1 shows a brake-clutch for a vehicle control system in a first mode of operation, as discussed previously.
Figure 2:
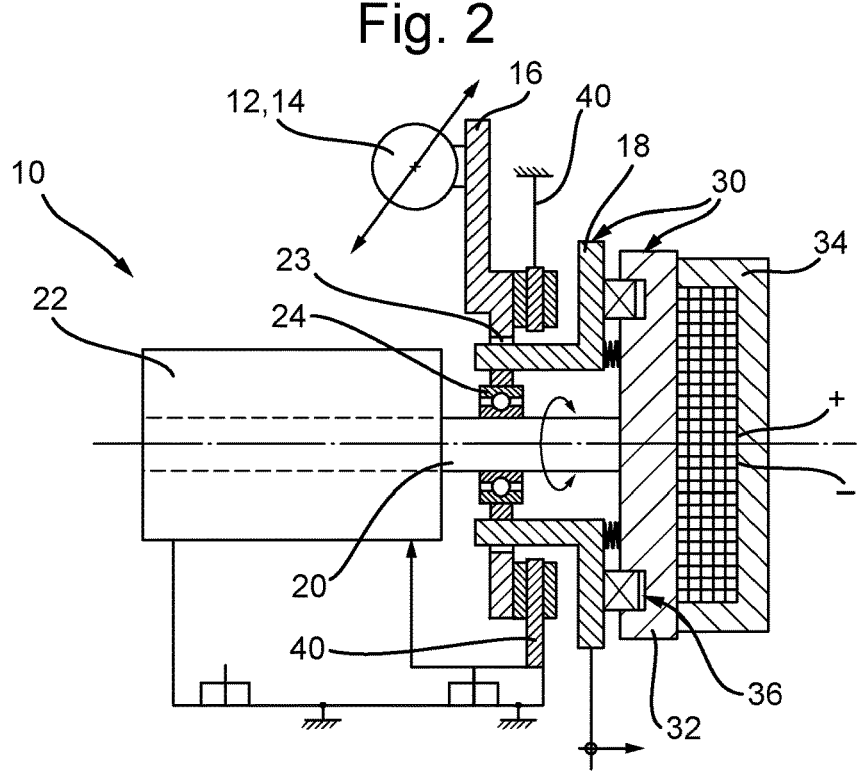
FIG. 2 shows the brake-clutch of FIG. 1 in a second mode of operation.
Figure 3:
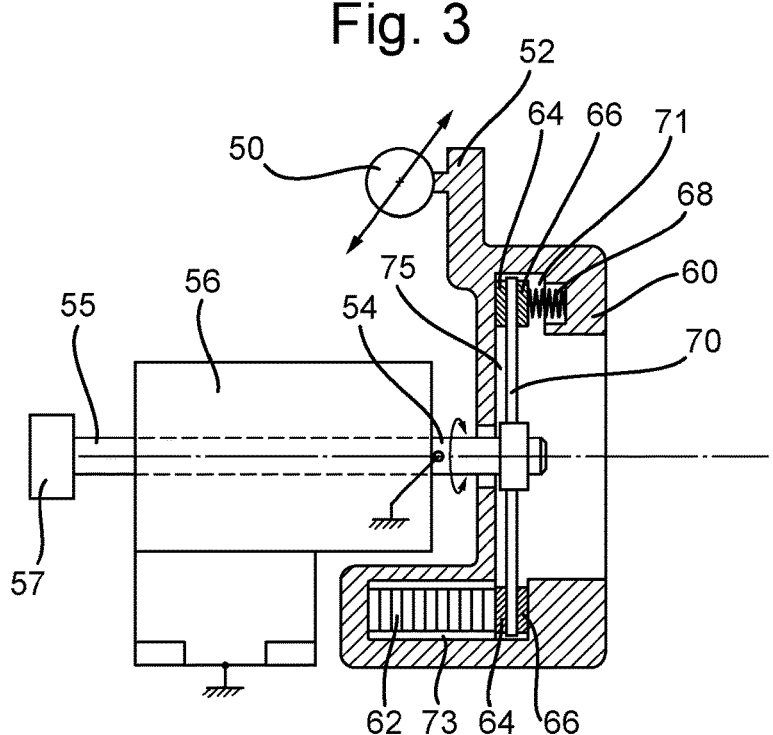
FIG. 3 shows a coupling for a vehicle control system according to the present invention in a first mode of operation in a "de-coupled" state applying a frictional resistance to movement of a vehicle control.
Figure 4:
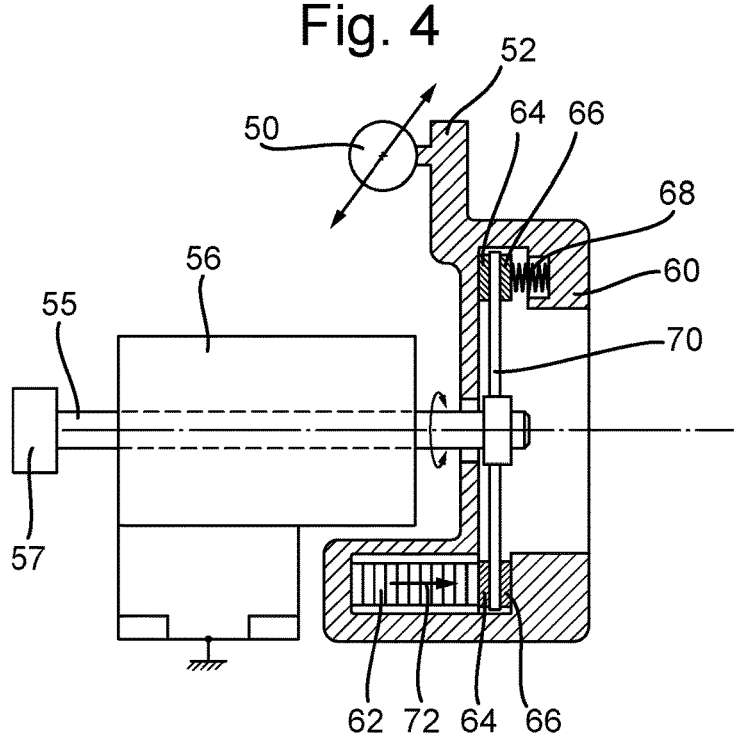
FIG. 4 shows the coupling of FIG. 3 in a second mode of operation in a "coupled" state.

An example of a vehicle control lever actuation system, for example a flight control lever system for an aircraft, comprising a coupling device of the present disclosure is shown in FIGS. 3, 4.

A vehicle control lever 50, for example a joystick or inceptor for an aircraft, is selectively linked to a lever drive 56, which may be a motor or gear box, via a coupling according to the present disclosure.

The coupling comprises a clutch plate 70 (which may also be termed a brake disc or brake plate), a ring shaped housing 52 which surrounds the brake plate 70, and a rotatable drive shaft 54 that extends from the lever drive 56 and is rotatable about a rotational axis 55. The brake plate 70 is located in an annular groove 75 provided in the housing 52. The brake plate 70 is fixedly mounted to the rotatable drive shaft 54 and extends away from the shaft 54 in a radial direction. The housing 52 is rotatable with, and about the same rotational axis 55 as, the brake plate 70.

A first friction pad 64, or brake pad, is mounted adjacent the brake plate 70.

The first friction pad 64 is mounted and operable such that it may be selectively biased against the brake plate 70 by a first force, and also biased against the clutch plate by a second force greater than the first force.

The first friction pad 64 is operable to be selectively biased against the brake plate 70 by an actuator 62, for example a piezo electric actuator. The actuator 62 is located in a first cavity 73 provided in the housing 52, and hence carried by the housing 52.

A second friction pad 66, or brake pad, is biased into contact with the brake plate 70 by a resilient member 68. The resilient member 68 may be a passive device, for example a spring. The resilient member 68 is located in a second cavity 71 provided in the housing 52, and hence carried by the housing 52.

The spring 68 provides a passive compression force to press the brake pad 66 against the brake plate 70, to thereby provide a passive frictional force that resists, but does not prevent, rotation of the brake plate 70 relative to the housing 52.

In the example shown, the outer circumference of the brake plate 70 is located between the pads 64, 66.

The resilient member 68 is biased against the brake plate 70 on the opposite side of the brake plate 70 to the actuator 62. Hence the resilient member 68 is operable to bias the second friction pad 68 in an opposite direction to which the actuator 62 is operable to bias the first friction pad 64.

There may also be provided a shaft brake 57 for preventing rotation of the drive shaft 54 in the first mode of operation. The shaft brake 57 is selectively operable to engage or disengage with the shaft 54 as required. The shaft brake 57 may be provided as part of the lever drive unit 56, or external and/or separate to the lever drive unit 56.

In the first mode of operation the lever drive 56 is non operational and thus either jammed by a malfunction, deliberately switched off or locked by some other means. For example the shaft 54 may be definitively locked in position by the shaft brake 57 in order to ensure the shaft 54 is fixed into a non rotatable state.

In the first mode of operation the second friction pad 66 is biased into contact with the brake plate 70.

In the first mode of operation the actuator 62 may not be actively pressing the second pad 64 against the plate 70. However, the cavity 73, actuator 62 and pad 64 may be sized such that even at rest, the friction pad 64 is biased towards, and into contact with, the brake plate 70 by a first force. Hence in the first mode of operation the first friction pad 64 may also be biased against the brake plate 70, and thus resisting its rotation relative to the housing.

Alternatively, in the first mode of operation, the first friction pad 64 may be spaced apart from, or only lightly touching, the brake plate 70.

Hence in the first mode of operation, motion of the lever 50 by a user is resisted by virtue of its connection to the non-rotatable shaft 54 of the drive 56 via the housing 52 and brake pads 64, 66 acting on the brake plate 70. However, the lever 50 is operable to move (i.e. slide) relative to the brake plate 70, albeit with frictional resistance.

In a second mode of operation, as shown in FIG. 4, the lever drive 56 is operational and the shaft brake 57 is disengaged from the shaft 56 allowing the shaft to rotate. In the second mode, the piezo actuator 62 is operable to actuate to apply a brake force (i.e. second force), indicated by arrow 72, against the second pad 64 to fully engage with the brake plate 70. That is to say, the actuator 62 is operable to exert sufficient force on the brake plate 70 via the brake pad 64 such that the overall frictional force between the pads 64,66 and the plate 70 is greater than the operational torque provided by the lever drive 56. Thus slippage between the plate and ring 52 is prevented, fixing them together. The second force may be substantially greater than the first force.

Hence in the second mode of operation, slippage between the brake pads 64, 66 and the brake plate 70 is prevented such that there is a coupled link between the control lever 50 and the shaft 54. Hence motion of the shaft 54 by the drive 56 will result in movement of the lever 50 without slippage.

The coupling is selectively switched between the modes of operation, for example, either by default, as a result of detection of the operational status of the system, or on request by a user.

When assisted movement and/or control of the control levers is required (i.e. in the second mode of operation), the actuator 62 actively biases the pad 64 into frictional contact with the brake plate 70.

However, failure of the lever drive 56 or loss of power may result in a "fail safe" mode of operation (i.e. the first mode of operation) wherein the actuator 62 is non operational, and hence not actively biasing the pad 64 into frictional contact with the brake plate 70.

Alternatively the first mode of operation may be selectively chosen by the user of the vehicle, for example for full authority control of the vehicle, by preference or for training purposes.

Figure 5:
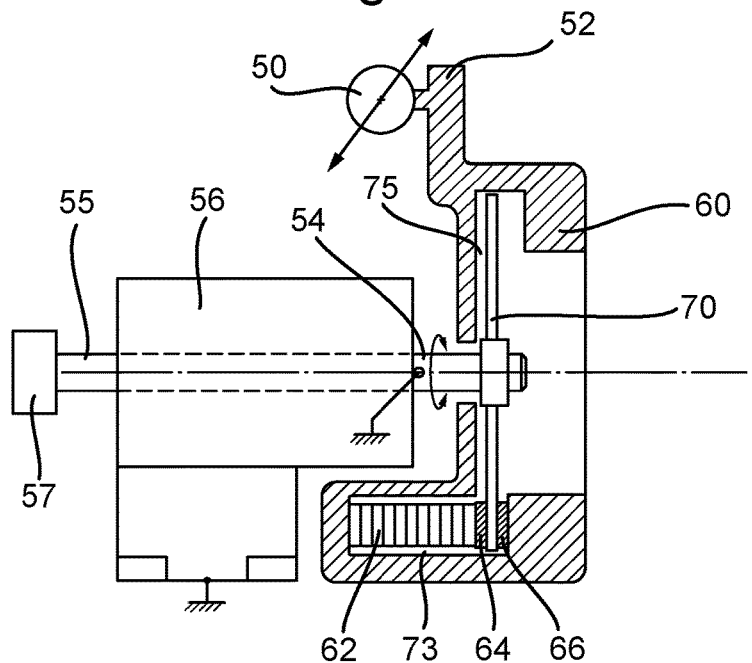
FIG. 5 shows an alternative example of a coupling for a vehicle control system according to the present disclosure in a first mode of operation in a "de-coupled" state applying a frictional resistance to movement of a vehicle control.
Figure 6:
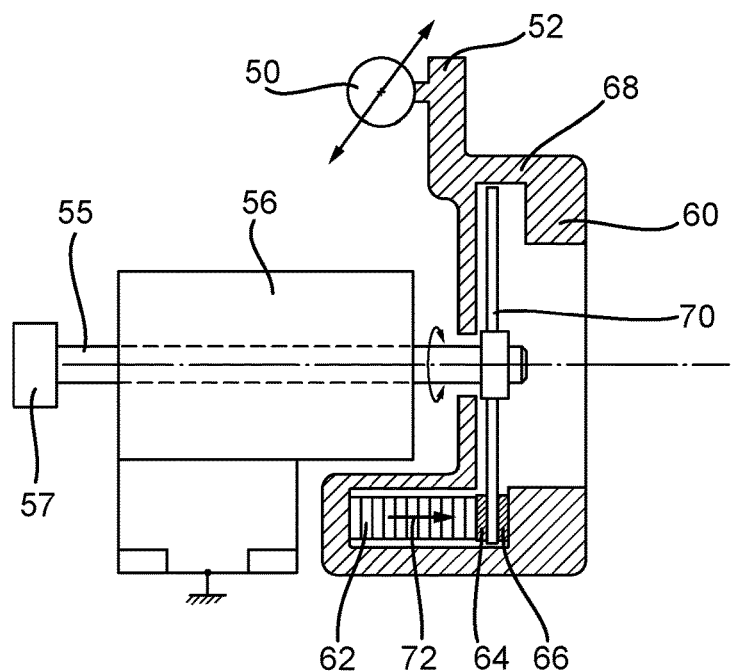
FIG. 6 shows the coupling of FIG. 5 in a second mode of operation in a "coupled" state.

An alternative example of a vehicle control lever actuation system according to the present disclosure is shown in FIGS. 5, 6.

The example shown in FIGS. 5,6 is identical to the examples of FIGS. 3,4 other than resilient member 68 and cavity 71 are not provided in the example of FIGS. 5,6.

Hence in this example, as in the example of FIGS. 3,4, the first friction pad 64 is operable to be selectively biased against the brake plate 70 by the actuator 62. In a first mode of operation the first friction pad 64 is biased against the brake 70 plate by a first force. In a second mode of operation the first friction pad 64 is biased against the brake plate 70 by a second force; the second force being substantially greater than the first force.

As in the example of FIGS. 3,4 in the first mode of operation the actuator 62 may not be actively pressing the second pad 64 against the plate 70. However, the cavity 73, actuator 62 and pad 64 may be sized such that even at rest, the friction pad 64 is biased towards, and into contact with, the brake plate 70 by a first force. Hence in the first mode of operation the first friction pad 64 may be biased against the brake plate 70, and thus resisting its rotation relative to the housing.

The actuator 62 of the examples shown in FIGS. 4 to 6 may be configured to selectively apply a further force, or range of forces on demand. For example, in addition to the modes of operation described above, in a further mode of operation the actuator 62 may be configured to apply an intermediate force, or range of intermediate forces, to the brake plate 70. The intermediate force, or range of intermediate forces, may be greater than the first force but lower than the second force. Thus the first friction pad 64 is operable to be selectively biased against the brake plate 70 such that in the further (i.e. third) mode of operation the first friction pad 64 is biased against the brake plate 70 by a third force, wherein the third force is greater than the first force but lower than the second force. Put another way, in a third mode of operation the first friction pad 64 is biased against the brake plate 70 by an intermediate force, or range of intermediate forces, wherein the intermediate force, or range of intermediate forces is/are greater than the first force but lower than the second force. With such functionality, varying amounts of slippage between the brake pads 64, 66 and the brake plate 70 is enabled either as a result of detection of the operational status of the system, or on request by a user.

The device of the present disclosure provides similar functionality to the brake-clutch arrangement of the related art, but is smaller, lighter and requires less electrical power to operate, which is hugely advantageous in aeronautical applications.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A coupling comprising:
   a brake plate fixedly mounted to a drive shaft which is rotatable about a rotational axis;
   a friction pad operable to be selectively biased against the brake plate by an actuator such that
   in a first mode of operation the friction pad is biased against the brake plate by a first force, and
   in a second mode of operation the friction pad is biased against the brake plate by a second force that is greater than the first force; and
   a vehicle control lever coupled to a lever drive via a housing rotatable about the rotational axis.

2. The coupling of claim 1, wherein the friction pad is operable to be selectively biased against the brake plate such that in a third mode of operation the friction pad is biased against the brake plate by a third force, wherein the third force is greater than the first force but lower than the second force.

3. The coupling of claim 1, wherein the friction pad is a friction pad, and wherein the coupling further comprises a second friction pad biased into contact with the brake plate.

4. The coupling of claim 3, wherein the second friction pad is biased into contact with the brake plate by a resilient member.

5. The coupling of claim 4, wherein the actuator is located in a first cavity of the housing, and wherein the housing carries the resilient member, the resilient member being located in a second cavity of the housing.

6. A vehicle control system comprising the coupling of claim 1.

7. The coupling of claim 1, wherein the actuator is located in a cavity of the housing.

8. The coupling of claim 7, wherein the friction pad is adjacent to the cavity of the housing.

9. The coupling of claim 1, wherein the friction pad is a first friction pad, wherein the coupling further comprises a second friction pad biased into contact with the brake plate, the second friction pad being biasable against the brake plate by a resilient member, wherein the resilient member is biasable against the brake plate on a first side of the brake plate and the actuator is located adjacent to an second side of the brake plate that is opposite the first side such that the resilient member is operable to bias the second friction pad in an opposite direction to which the actuator is operable to bias the first friction pad.

10. A coupling comprising:
    a brake plate fixedly mounted to a drive shaft which is rotatable about a rotational axis;
    a first friction pad operable to be selectively biased against the brake plate by an actuator such that
    in a first mode of operation the first friction pad is biased against the brake plate by a first force, and in a second mode of operation the first friction pad is biased against the brake plate by a second force that is greater than the first force; and
a second friction pad biased into contact with the brake plate, wherein the second friction pad is biased into contact with the brake plate by a resilient member;
wherein the actuator is located adjacent a first side of the brake plate,
wherein the resilient member is located adjacent to a second side of the brake plate, the second side being opposite the first side, and
wherein the resilient member is operable to bias the second friction pad in an opposite direction to which the actuator is operable to bias the first friction pad.

11. The coupling of claim 10, wherein the first friction pad is operable to be selectively biased against the brake plate such that in a third mode of operation the friction pad is biased against the brake plate by a third force, wherein the third force is greater than the first force but lower than the second force.

12. The coupling of claim 10, wherein the actuator is located in a first cavity of the housing, and the resilient member is located in a second cavity of the housing.

13. The coupling of claim 10, wherein the actuator is located in a cavity of the housing.

14. The coupling of claim 13, wherein the first friction pad is adjacent to the cavity of the housing.

15. A coupling comprising:
a brake plate;
a first friction pad operable to be selectively biased against the brake plate by an actuator such that
in a first mode of operation the first friction pad is biased against the brake plate by a first force, and
in a second mode of operation the first friction pad is biased against the brake plate by a second force that is greater than the first force; and
a second friction pad biased into contact with the brake plate by a resilient member,
wherein the resilient member is adjacent to a first side of the brake plate,
wherein the actuator is adjacent to a second side of the brake plate, the second side being opposite the first side, and
wherein the resilient member is operable to bias the second friction pad in an opposite direction to which the actuator is operable to bias the first friction pad.

16. The coupling of claim 15, wherein the first friction pad is operable to be selectively biased against the brake plate such that in a third mode of operation the friction pad is biased against the brake plate by a third force, wherein the third force is greater than the first force but lower than the second force.

17. The coupling of claim 15, wherein the actuator is located in a first cavity of the housing, and the resilient member is located in a second cavity of the housing.

18. The coupling of claim 15, wherein the actuator is located in a cavity of the housing.

19. The coupling of claim 18, wherein the first friction pad is adjacent to the cavity of the housing.

20. A vehicle control system comprising the coupling of claim 15.

* * * * *